US011529632B2

(12) United States Patent
Cao et al.

(10) Patent No.: US 11,529,632 B2
(45) Date of Patent: Dec. 20, 2022

(54) CLOUD-ENABLED PASSIVE WIRELESS IONIC SENSING IN SMALL VIALS

(71) Applicants: THE REGENTS OF THE UNIVERSITY OF CALIFORNIA, Oakland, CA (US); Sensoriis, Inc., Edmonds, WA (US)

(72) Inventors: Hung Cao, Irvine, CA (US); Paul Marsh, Irvine, CA (US); Michael Lau, Edmonds, WA (US)

(73) Assignees: THE REGENTS OF THE UNIVERSITY OF CALIFORNIA, Oakland, CA (US); SENSORIIS, INC., Edmonds, WA (US)

( * ) Notice: Subject to any disclaimer, the term of this patent is extended or adjusted under 35 U.S.C. 154(b) by 286 days.

(21) Appl. No.: 17/013,145

(22) Filed: Sep. 4, 2020

(65) Prior Publication Data

US 2021/0069695 A1    Mar. 11, 2021

Related U.S. Application Data

(60) Provisional application No. 62/897,119, filed on Sep. 6, 2019.

(51) Int. Cl.
*G01N 31/00* (2006.01)
*H04B 1/3827* (2015.01)
(Continued)

(52) U.S. Cl.
CPC ............ *B01L 3/5082* (2013.01); *G01N 27/62* (2013.01); *H02J 50/80* (2016.02); *H04B 5/0031* (2013.01); *H04B 5/0075* (2013.01); *H04W 4/38* (2018.02)

(58) Field of Classification Search
None
See application file for complete search history.

(56) References Cited

U.S. PATENT DOCUMENTS 9,361,780 B2 *   6/2016   Burke, Jr. .............. G08B 21/24
9,729,182 B2 *   8/2017   Fracchia .............. H04B 1/3827
(Continued)

FOREIGN PATENT DOCUMENTS

CN      205656161      * 10/2016      ............. G01N 27/36
CN      207423952      *  5/2018      ............. G01N 33/18
(Continued)

*Primary Examiner* — Tuan A Tran
(74) *Attorney, Agent, or Firm* — Nguyen Tarbet LLC (57) ABSTRACT

The present invention features the application of a simple, inductively-coupled measurement system into the cap of standard laboratory sample tubes, thus enabling continuous, wireless ionic sensing of a bevy of samples. The system may be powered by a compact Class E amplifier using inductive coupling via a designed resonance frequency of 1 MHz. Other frequencies can be used, such as the popular near-field communication (NFC) frequency of 13.66 MHz. Signals are transmitted back via load modulation at frequencies a fraction of the power carrier frequency, thus allowing for extraction of the signal frequency. Results clearly show that modulation frequency tracks closely with open circuit potential, and the system features good sensitivity and linearity. This system holds promise for a host of applications.

15 Claims, 8 Drawing Sheets

(8 of 8 Drawing Sheet(s) Filed in Color)

(51) Int. Cl.
*H04B 1/3888* (2015.01)
*G08C 19/04* (2006.01)
*B01L 3/00* (2006.01)
*H04B 5/00* (2006.01)
*G01N 27/62* (2021.01)
*H04W 4/38* (2018.01)
*H02J 50/80* (2016.01)

(56) References Cited

U.S. PATENT DOCUMENTS

| | | | | |
|---|---|---|---|---|
| 10,309,873 B2 * | 6/2019 | Jagiella | ............... | G08C 17/02 |
| 10,675,216 B2 * | 6/2020 | Mejia | ............... | A61J 7/04 |
| 10,704,993 B2 * | 7/2020 | Barnhart | ............... | C12Q 1/64 |
| 10,866,208 B2 * | 12/2020 | Mansergh | ............... | G01N 27/27 |
| 11,213,458 B2 * | 1/2022 | Taylor | ............... | A61J 7/0436 |
| 11,352,880 B2 * | 6/2022 | Rodney | ............... | E21B 47/022 |
| 2009/0084976 A1 * | 4/2009 | Camilli | ............... | H01J 49/24 |
| | | | | 250/397 |
| 2009/0210169 A1 * | 8/2009 | Potyrailo | ............... | G01N 33/1886 |
| | | | | 702/57 |
| 2015/0325097 A1 * | 11/2015 | Misra | ............... | G01F 23/292 |
| | | | | 340/540 |
| 2019/0246455 A1 * | 8/2019 | Weber | ............... | H05B 3/80 |
| 2020/0096474 A1 * | 3/2020 | Mansergh | ............... | G01K 13/00 |
| 2020/0149396 A1 * | 5/2020 | Rodney | ............... | E21B 47/10 |
| 2020/0209935 A1 * | 7/2020 | Har-Shai | ............... | G08B 21/18 |
| 2022/0163509 A1 * | 5/2022 | Gupta | ............... | A61B 5/1468 |

FOREIGN PATENT DOCUMENTS

| | | | | |
|---|---|---|---|---|
| CN | 208125730 | * 11/2018 | ............... | G01N 33/24 |
| WO | WO 2016115618 | * 10/2010 | ............... | G07C 5/0808 |
| WO | WO 2014/126482 | * 8/2015 | ............... | A61B 10/02 |
| WO | WO 2016131732 | * 8/2016 | ............... | G01N 27/4168 |

* cited by examiner

CLOUD-ENABLED PASSIVE WIRELESS IONIC SENSING IN SMALL VIALS

CROSS-REFERENCES TO RELATED APPLICATIONS

This application is a non-provisional and claims benefit of U.S. Patent Application No. 62/897,119, filed Sep. 6, 2019, the specification(s) of which is/are incorporated herein in their entirety by reference.

BACKGROUND OF THE INVENTION

Field of the Invention

The present invention relates to passive wireless ionic sensors. More specifically, the present invention relates to modular cap-integrated ionic sensors for sample tube batches.

Background Art

Ionic sensing in real-time across a multitude of lab samples is a labor-intensive task, wherein the researcher may have to manually measure each sample container or, at a minimum, fabricate a measurement apparatus for each sample. It also exposes samples to varying environmental conditions with each measurement. For example, it has previously been found that varying oxygen levels can cause differences in gene expression. Oxygen content is a condition which could vary in local atmosphere due to heterotrophic microbial respiration, human respiration, or other reaction pathways, and should be controlled for in pH monitoring of cultures. Other applicable scenarios can be listed as, for example, water samples being monitored over time: exposure to $CO_2$ will cause the creation of carbonic acid and alter pH readings assumed to be the result of other factors. There are a variety of biological and environmental samples in which chemical monitoring should be performed in atmospheres where humidity, temperature, and gas content are controlled.

Ionic sensing in enclosed environments is currently possible but either costly, difficult to arrange into an apparatus, or still requires manual input. The most common device used is the glass style, dual junction, Ag/AgCl sensors for monitoring the pH of a solution; these feature low drift and high accuracy but take up considerable space and, if fitted individually to each sample container, would be prohibitively expensive. A researcher can choose to purchase these in bulk and fit them to a batch of samples to be monitored simultaneously; however, there are only a few real-time monitoring solutions available and most feature only a few input channels. Further, these systems are quite expensive.

BRIEF SUMMARY OF THE INVENTION

It is an objective of the present invention to provide systems, devices, and methods that allow for continuous, wireless ionic sensing, as specified in the independent claims. Embodiments of the invention are given in the dependent claims. Embodiments of the present invention can be freely combined with each other if they are not mutually exclusive.

The present invention features a reusable sample container cap with swappable sensors which can be screwed on to a standard sample tube and fitted to a base station monitoring an array of containers. One embodiment of this system is shown in FIG. 1B, which shows a basic layout of this system and the cap-integrated receiver (RX) side. This device uses inductively coupled coils for power transmission and communication (by load modulation—LM), sampling an iridium oxide (IrOx) probe. An LM printed circuit board (PCB), with solenoid antenna, is fitted to the cap and interfaces with disposable IrOx/AgCl electrodes on polyimide substrates. There are several benefits of this design. First, electrodeposited IrOx probes are simple and inexpensive to produce as well as being high performance materials. Second, these caps can be designed to fit a variety of pre-existing tube designs of varying capacity (20 mL, 30 mL, 50 mL and 100 mL). Third, the passive wireless system reduces device complexity and cost, and the live/continuous data recording allows users to both keep their samples out of ambient environmental conditions and perform analysis in real time. Given the simplicity of both the transmitting and receiving sides, the system can easily be reconfigured to communicate continuously with large sets of samples or can include linear/rotary mechanical systems for rapid discrete measurements of that same sample set. The physical circuit arrangement can be easily rearranged to accommodate a variety of sensor materials and configurations such as similar planar probes of other material families, identical probes bearing other metal oxides, glassy dual junction probes, etc. The complete system also features instrumentation for modulated signal extraction, upload to a cloud database, and graphical-user-interface (GUI) access. It is believed that this device may yield significantly improved data collection in a myriad of lab sciences.

One of the unique and inventive technical features of the present invention is a cap with an integrated potentiometric chemical sensor and passive wireless transmitter. Without wishing to limit the invention to any theory or mechanism, it is believed that the technical feature of the present invention advantageously provides for wireless and continuous data collection from a number of chemical samples. Furthermore, the circuitry can be interchanged to monitor other ionic sensors. None of the presently known prior references or work has the unique inventive technical feature of the present invention.

The prior references teach away from the present invention. For example, most recent literature in wireless sensing makes use of digital schemes, such as Bluetooth (BT) communication; while robust and scalable in terms of channels, their additional complexity typically necessitates onboard energy storage (even Bluetooth Low Energy (BLE) systems), which adds further complexity and necessitates limits on the overall form factor which exceed those of a single analog LM application-specific integrated circuit (ASIC) and antenna. The base station still requires a power amplifier but the simpler analog-to-digital (ADC) circuitry is moved to the RX side, further increasing cost, complexity, and power requirements in the portion of the system which is to be mass produced (the cap); this is not to mention the additional BT or BLE circuitry which is now required at the base station, and the fact that BT/BLE communication must be cycled sequentially to sample from a batch of caps differs in no temporal way from sequential analog sampling. Therefore, digital communication schemes, which have become the norm, serve to further complicate the system in question and raise its cost while providing little benefit outside of added signal robustness. That being said, the present invention still allows for the addition of digital communication with minimal modification, if so desired.

A second example of prior literature teaching away from the present invention is that of single-point measurement systems, typically referred to as "system-on-chip" (SoC) or "lab-on-a-chip" (LoC). Many recent patents and academic literature focus on systems in which the sample is transported to, or drawn into, a system featuring a chemical sensor and onboard circuitry; however, there has been little focus on integration of those systems into convenient application-based physical configurations via form factor reduction (device simplicity) and low production costs (segmentation of reusable and disposable sections). To the first point: many designs attempt the digital communication scheme discussed above, if the SoC/LoC even communicates wirelessly. To the second: while disposable chemical sensors attached to reusable SoC/LoC's have been demonstrated, they are typically monolithic in terms of their sensor interface, communication hardware, and sample interface hardware; the design described herein is modular in the sense that sensing, communication, and antenna circuitry and physical sample interface hardware can all be easily separated and replaced or modified as necessary. Therefore, the prior art teaches away from this invention in that the current trend is to unify the components, rather than modularize them for various sensing duties.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE SEVERAL VIEWS OF THE DRAWINGS

The patent application or application file contains at least one drawing executed in color. Copies of this patent or patent application publication with color drawing(s) will be provided by the Office upon request and payment of the necessary fee.

The features and advantages of the present invention will become apparent from a consideration of the following detailed description presented in connection with the accompanying drawings in which:

FIGS. 4A-4C show data as recorded with coated IrOx probes. FIG. 48 and FIG. 4C represent two separate probes and calibrations.

FIGS. 5A-5B show examples of schematics for the present invention.

DETAILED DESCRIPTION OF THE INVENTION

Following is a list of elements corresponding to a particular element referred to herein:
100 sample cap
102 cap body
104 printed circuit board
106 ionic sensor
108 sample container In one embodiment, the present invention features a sample container cap with swappable ionic sensors which can be screwed on to a standard sample tube and fitted to a base station monitoring an array of containers. This device utilizes both load modulation-based (LM) inductive coupling (for power and communication) and iridium oxide (IrOx) probes by combining them into a single Integrated design; an LM PCB, with planar antenna, is fitted inside the cap and interfaces with dual IrOx/AgCl electrodes on a polyimide substrate which can be swapped out once the probe has degraded. There are several benefits: electrodeposited IrOx probes are simple and inexpensive to produce as well as being high performance materials, these caps can be designed to fit a variety of pre-existing tube designs, the passive wireless system reduces device complexity and cost, and the live/continuous data recording allows user to both keep their samples out of ambient environmental conditions and perform analysis in real time.

Figure 1A:
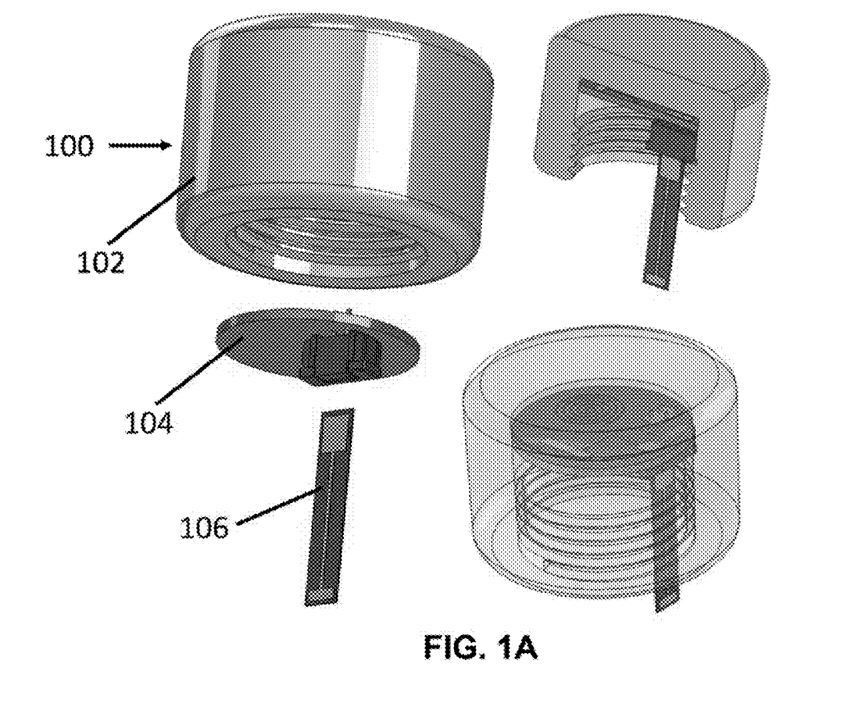
FIG. 1A shows Illustrations of the cap design, including the integrated printed circuit board (PCB), and an ionic sensor.
Figure 1B:
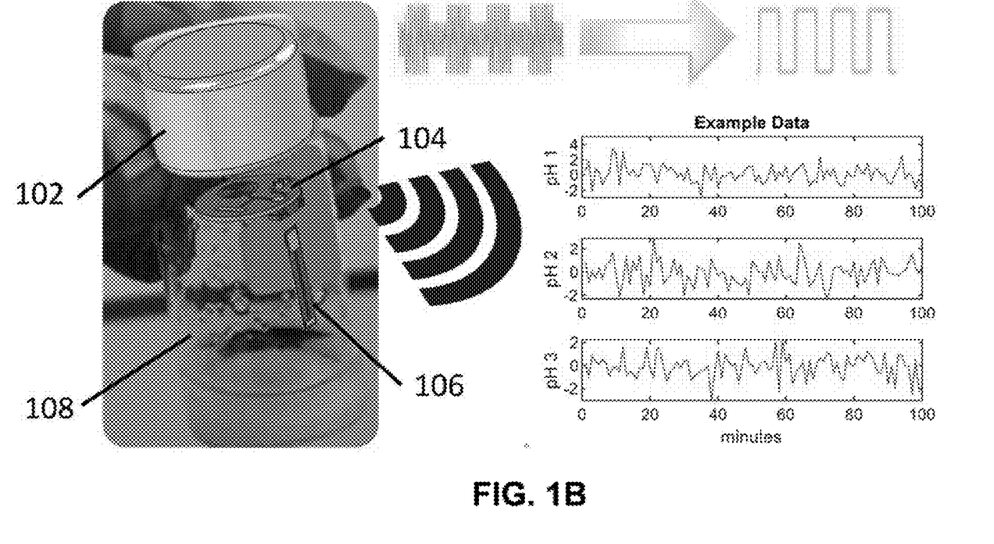
FIG. 1B shows an illustration of a complete system of the present invention, including a base station, data transmission, and an in-cap probe.
Figure 1C:
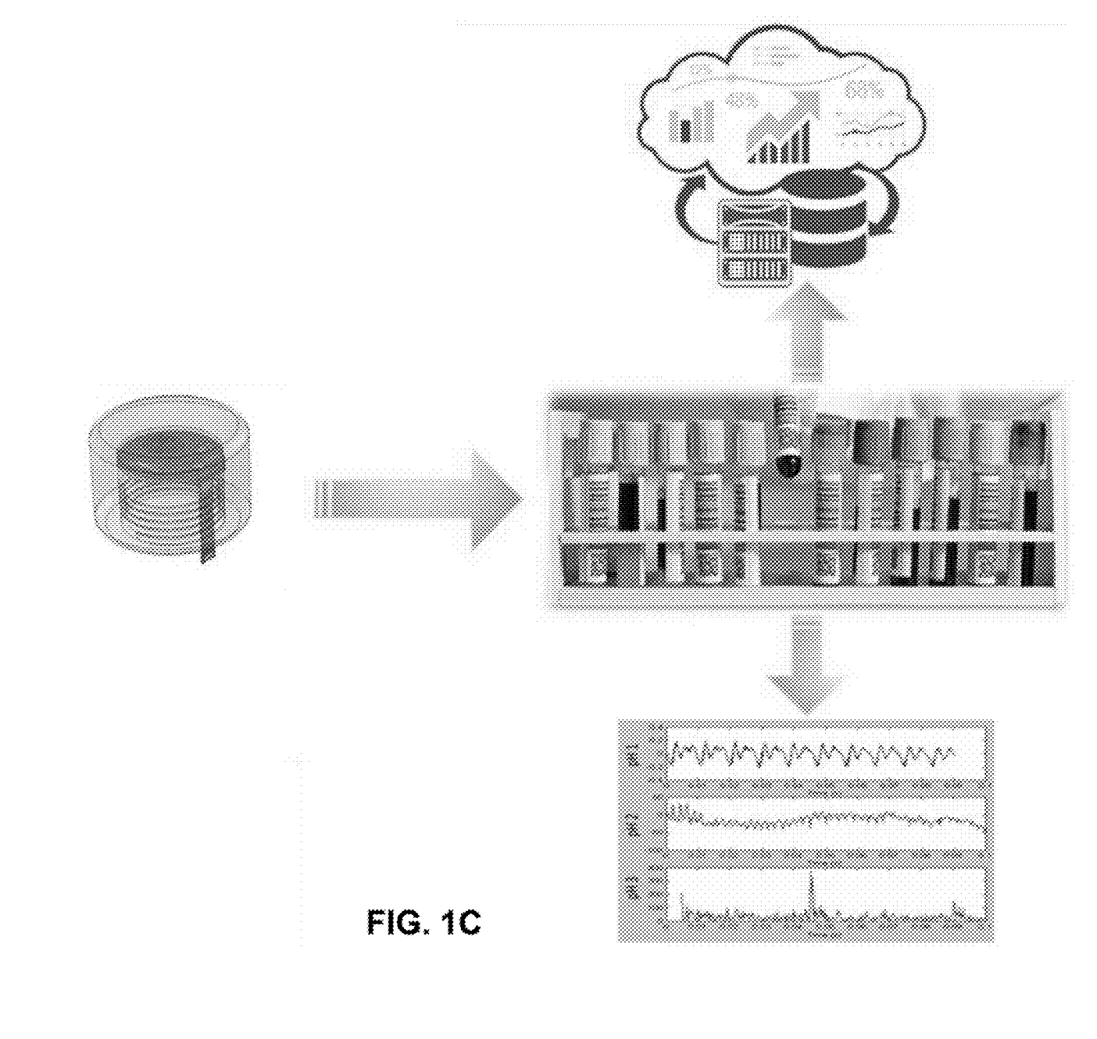
FIG. 1C shows an illustration of the cap in use for monitoring the pH of an array of samples, and the data subsequently being stored in an onsite or offsite database.
Figure 1D:
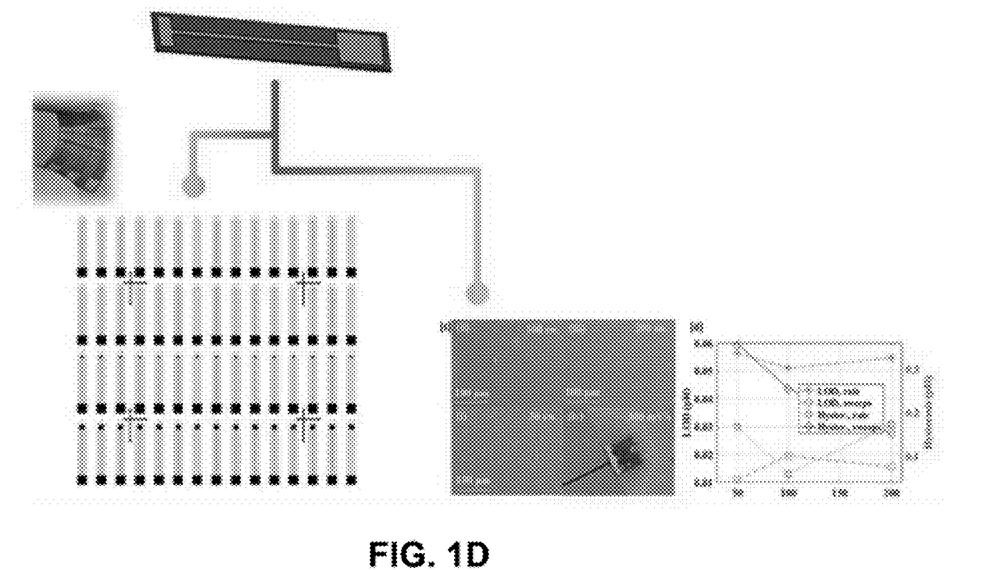
FIG. 1D shows an illustration of the probe design integrated to the cap, as well as some representative fabrication and calibration data.
Figure 1E:
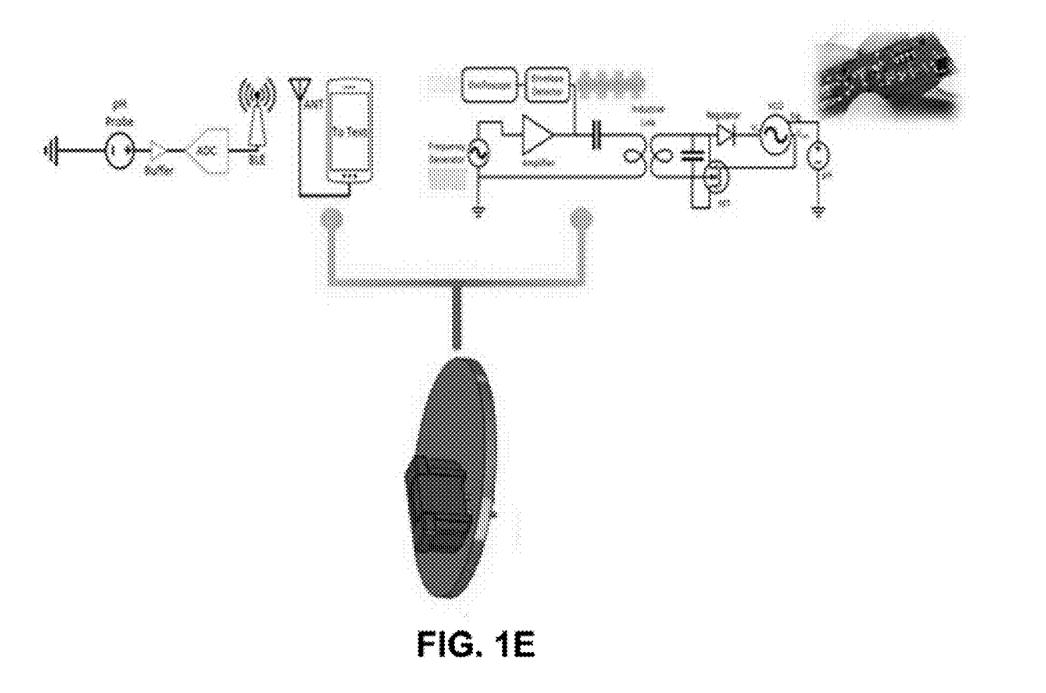
FIG. 1E shows an illustration of simplified schematics for the PCB; on the left is a possible digital communication scheme, while the right is the analog scheme as-tested.

Referring now to FIG. 1A, the present invention features three main components: one or more ionic sensors (in this case, IrOx and silver chloride deposited by electrodeposition and manual application, respectively, on a stack of sputtered gold and chromium on flexible polyimide sheet, used for pH sensing), a PCB featuring analog passive backscatter wireless transmission via a planar, thin-film antenna (the potentiometric sensor input goes to a buffer and voltage-controlled oscillator), as well as zero insertion force style connector for flexible printed circuits, and a polymer cap for laboratory sample containers.

According to one embodiment, the present invention features a system for passive wireless ionic sensing. As a non-limiting example, the system may comprise: a sample container (108) and a sample cap (100). In some embodiments, the cap may comprise: a cap body (102), configured to fit over an opening of a sample container (108); a printed circuit board (PCB) (104); and one or more ionic sensors (106). The PCB (104) may be integrated with the cap body and may comprise a planar solenoid antenna configured to act as an inductive power receiver, and the PCB may comprise a passive wireless transmitter. Alternatively, the PCB may comprise another suitable passive antenna. The configurations of the passive antenna may include, but are not limited to, a planar antenna disposed on the PCB or a solenoid antenna wrapped around the sample cap. In a preferred embodiment, the sensors may be electrically coupled with the PCB.

The sensors may extend downwardly from the PCB so as to contact a solution in the sample container. In selected embodiments, the sample container may have an opening configured to fit the sample cap. In other embodiments, the system comprises a processor operatively coupled to the PCB, and a memory unit operatively coupled to the processor. The memory unit is configured to store digitally encoded instructions that, when executed by the processor, cause the processor to perform operations including, supplying power to the one or more ionic sensors, said power being generated by inductive coupling with the planar solenoid antenna, receiving a signal from the one or more ionic sensors via the planar solenoid antenna, and transmitting the signal via the passive wireless transmitter.

In some embodiments, the system is wirelessly coupled to a base station, and the base station may be configured to monitor an array of sample containers (108). In one embodiment, the base station receives the signal transmitted by the passive wireless transmitter. In further embodiments, the base station may interface with a cloud computing system so as to upload the detected data to a database. The cloud computing system may include but is not limited to: hardware and algorithms to retrieve the modulation signal, hardware and algorithms to convert that modulation signal to a frequency count (via discrete time fourier transform or analog means), hardware and algorithms to communicate the detected data to a database (offsite or onsite, instantiated virtual machine or physical drive), and software and algorithms to control access through a custom graphical-user-interface (GUI). In one embodiment, the present invention may also feature a sampling base station which includes a backscatter antenna, an envelope detector, and a logger channel for each of the array of sample containers (108).

In one embodiment, the cap comprises one or more ionic sensors (106). The cap may comprise 2 to 5 sensors. In some embodiments, the one or more ionic sensors generate a signal corresponding to a pH, salt concentration, or other ions in solution. As non-limiting examples, the one or more ionic sensors may be used for monitoring pH, salt concentration, or other ions in a sample or solution; interfacing sensors can also be used for the measurement of temperature, conductivity, and similar measurements. The ions may include, but are not limited to, $Na^+$, $Ag^+$, $Li^+$, $K^+$, etc. In some embodiments, the one or more ionic sensors may monitor the same or different ions in a sample or solution. In other embodiments, the sensors may be used for monitoring a combination of pH and temperature, or pH and ions, or temperature and ions, or pH, temperature, salt concentration, and ions, etc.

In selected embodiments, the probe may be enclosed physically and have the sample volume drawn up to it through a dedicated channel by capillary, electro-kinetic, pressure, or other means. According to some embodiments, the system may allow for monitoring of a sample or solution within the sample container (108) without exposing the sample or solution to an environment external to the sample container. As a non-limiting example, the sample cap (100) may be airtight and may completely seal the opening of the sample container (108). In some embodiments, the system may allow for continuous monitoring of a sample or solution in the sample container (108). According to some embodiments, the sample container (108) may have a capacity of about 0.1 mL, 1 mL, 2 mL, 3 mL, 4 mL, 5 mL, 10 mL, 15 mL, 20 mL, 25 mL, 30 mL, 40 mL, 50 mL, 100 mL, 150 mL, 200 mL, 400 mL, 500 mL, 1000 mL, 2000 mL, 5000 mL, or greater than 5000 mL. In some embodiments, the sample cap (100) may have diameters in the range of 6 mm to 30 mm or greater than 30 mm. In some embodiments, the sample cap (100) may have a height in the range of 5 mm to 20 mm or greater than 20 mm.

In one embodiment, the one or more ionic sensors (106) comprise both a working electrode and a reference electrode on a substrate. In a preferred embodiment, these electrodes may be separated from each other. As a non-limiting example, the substrate may comprise a flexible polymer such as polyimide. In some embodiments, the working electrode may comprise a metal oxide electrode, and the reference electrode an AgCl electrode. In other embodiments, glassy dual junction electrodes may be used. In selected embodiments, the electrodes are configured to be replaced if they are degraded. As a non-limiting example, the sample cap may be designed such that the sensor unit easily detaches and a new unit fits into place. The types of probe contacts depend only on the connector geometry, sensing circuitry, and materials used. The probe contacts may include, but are not limited to, working electrodes, reference electrodes, counter electrodes, or pseudo-reference electrodes. Non-limiting examples of the contact materials include thick-film or thin-film, and may feature a variety of protective or additive films, membranes, or adlayers.

In a preferred embodiment, the system may use load modulation to generate a signal from the sample cap. In some embodiments, the signal may have a frequency which is a fraction of a power carrier frequency. In other embodiments, a battery may be installed onboard, and communication may be digital by a wireless protocol such as Bluetooth or similar.

According to one embodiment, the PCB (104) may comprise two opposing metal oxide silicon field effect transistors (MOSFETs). The MOSFETs may be placed either in parallel to or in series with the power transmission lines. In other embodiments, other transistor types or more complex integrated circuits (ICs) could be used to modulate the receiver load. In another embodiment, the system may be configured to be powered by a Class E amplifier. In still other embodiments the system may be configured to be powered by another suitable amplifier. In some embodiments, the system may be configured to be powered via a designated resonance frequency of about 1 MHz. In other embodiments, the system may be configured to be powered via a designated resonance frequency of about 0.001 MHz, 0.005 MHz, 0.01 MHz, 0.05 MHz, 0.1 MHz, 0.5 MHz, 5 MHz, 10 MHz, 13.56 MHz, 50 MHz, 100 MHz, 500 MHz, 1000 MHz, or greater than 1000 MHz.

In an embodiment, the present invention features a passive wireless chemical sensing device. As a non-limiting example, the device may comprise: a printed circuit board (PCB) comprising a passive wireless transmitter configured for analog passive backscatter wireless transmission or digital communication; and one or more potentiometric or other temporally static electrical output chemical sensors electrically coupled with the PCB (104). In some embodiments, the device may be integrated within a sample cap (100). In still other embodiments, the device may be configured to be powered using inductive coupling. In some embodiments, the device comprises a processor operatively coupled to the PCB (104), and a memory unit operatively coupled to the processor. The memory unit is configured to store digitally encoded instructions that, when executed by the processor, cause the processor to perform operations including, supplying power to the one or more ionic sensors, said power being generated by inductive coupling with the planar solenoid antenna, receiving a signal from the one or more ionic sensors via the planar solenoid antenna, and transmitting the signal via the passive wireless transmitter.

In some embodiments, the transmitter may be configured to generate a load modulation-based communication signal. In other embodiments, digital communication methods may be implemented onboard. The digital communication methods include, but are not limited to, Bluetooth or Zigbee or similar methods.

In one embodiment, the present invention features a method for continuous wireless ionic sensing of a chemical solution in a sample container (108). As a non-limiting example, the method may comprise: providing a sample cap (100); affixing the sample cap (100) to the sample container (108), such that the one or more ionic sensors (106) are in contact with the solution; providing a base station configured to power the sample cap; placing the capped sample container (108) in proximity to the base station; wirelessly powering the Ionic sensor via resonant Inductive coupling to the base station; transmitting an output signal from the PCB; and receiving the output signal via the base station. In some embodiments, the sample cap (100) comprises a cap body (102), configured to fit over an opening of a sample container (108), a printed circuit board (PCB) (104), integrated with the cap body (102), the PCB comprising a planar solenoid antenna configured to act as an inductive power receiver, the PCB comprising a passive wireless transmitter, and one or more ionic sensors (106) coupled to the PCB. In one embodiment, the probe contact surfaces may be physically separated from the sample solution, and the sample solution may be transported to the probe by means of a fluid chamber. This chamber may drive fluid by pressure, electrokinetic means, capillary force inductions, or other means. According to some embodiments, the base station may simultaneously monitor solutions from an array of sample containers.

EXAMPLE

The following is a non-limiting example of the present invention. It is to be understood that said example is not intended to limit the present invention in any way. Equivalents or substitutes are within the scope of the present invention.

Device Design
DH Measurement

Measurement of pH is done by open-circuit potential (OCP) between an IrOx working electrode (WE) and any suitable reference electrode (RE). In most cases, silver chloride (AgCl) paste is used; for the purposes of isolating IrOx performance and device output from RE potential drift, a commercial RE was used in this case (see Test Procedure). A simple voltage buffer is used to ensure that current flow, thus faradaic reactions, does not occur. This configuration and its fabrication have been discussed in other literature. In one example, a simple voltage follower with significantly high input impedance and appropriate gain (1 to 2.5) can allow for OCP measurement without appreciable Faradaic reactions in the IrOx. In the present invention, no gain was required at the voltage follower.

Inductively-Coupled Power Transmission and Communication

Figure 2A:
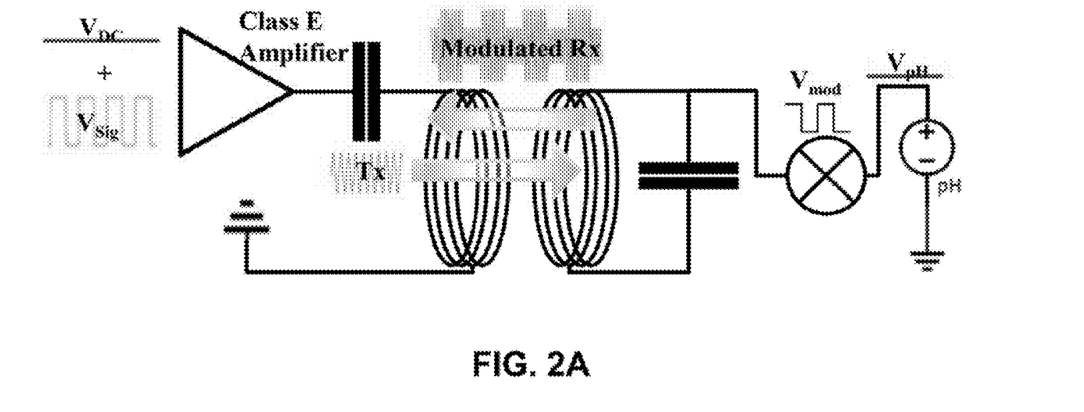
FIG. 2A shows a simplified schematic demonstrating that power is inductively coupled into the cap side and a load modulation-based communication signal is sent back.
Figure 2B:
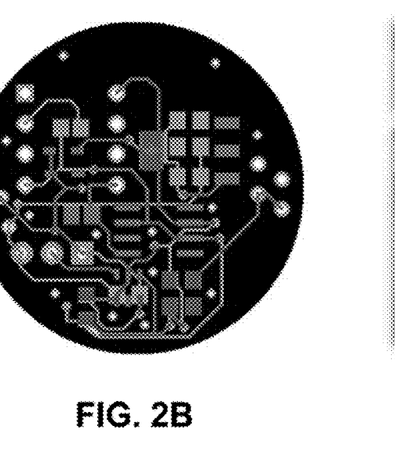
FIG. 2B shows a Cap PCB design, dual layer and measuring in at 28 mm in diameter.
Figure 2C:
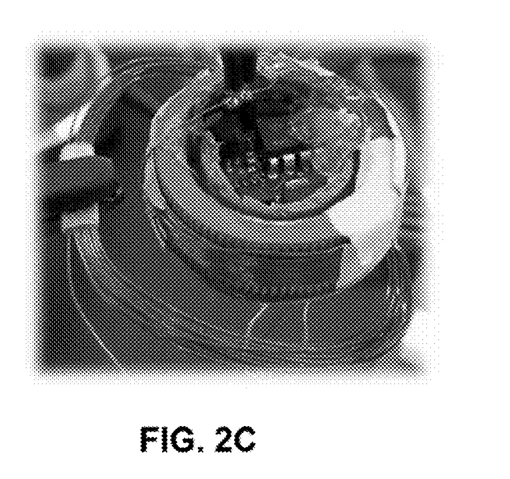
FIG. 2C shows a PCB and coil mounted into a demo cap, with a solenoid coil mounted externally. One of many possible TX-side coils is shown beneath it; in this example, a nearly identical coil was placed beneath the PCB coil.

A base platform had been previously built for testing of inductively-coupled power transmission and communication by load modulation. While the initial demonstration focused on measurement of ECG signals, a subsequent demonstration featured an open circuit potential measurement with the system for the purposes of pH measurement. To briefly review the system shown in FIG. 2A, the system essentially places allow frequency modulation signal atop a high frequency carrier signal (2-25 kHz and 1 MHz, respectively) based on a DC-to-FM conversion of the measurement signal by voltage-controlled oscillator (VCO). The modulated signal is sampled at the carrier transmitting solenoid coil (TX) and the modulation frequency could be easily measured atop the carrier the previous multi-stage Salen-Key bandpass filter and envelope detector was deemed unnecessary given the frequencies of interest and possible noise sources. The modulated square wave is then triggered on and a simple frequency measurement is taken via oscilloscope, for the purposes of this demonstration. In this case, the TX side L was 8.6 µH with a series C of 10 nF, while the RX side L was 9.5 µH with a parallel C of 2.7 nF; in practice, the complete system resonated close to 980 kHz. The most notable difference in this work is that the single modulation MOSFET was replaced with two opposing MOSFETs to ensure that the body diodes did not allow current passage unless the gate voltages were raised, regardless of drain-source relationships in these amplitude ranges. In a further demonstration, these two MOSFETs were placed in series with the receiving antenna to improve efficiency.

The Class-E amplifier was modified from previous work. In order to achieve as efficient a design as possible, an empirical design guide was used. Once again, a 1 W power output was targeted for the Class E amplifier to ensure testing functionality. $L_1$, the choke inductor, was chosen to be 150 pH and the other component values followed from there. The final amplifier configuration featured only 3 passive components outside the inductive coil. It was tuned as close to purely inductive as possible, thus the series $C_2$ of 10 nF. The parallel $C_1$ was chosen to be 470 pF and a load resistor of 18Ω was used.

Figure 3A:
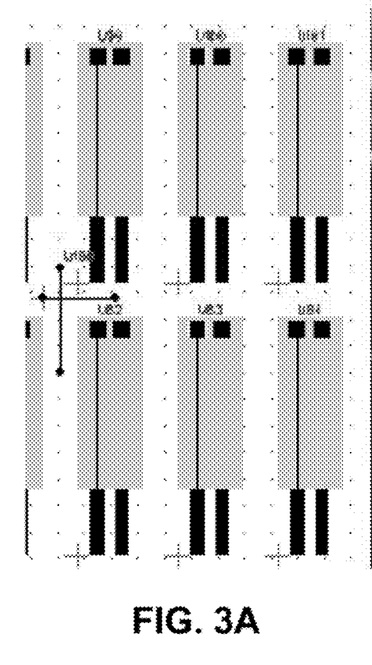
FIG. 3A shows an illustration of the probe mask design, which provides both a working electrode and a reference electrode.
Figure 3B:
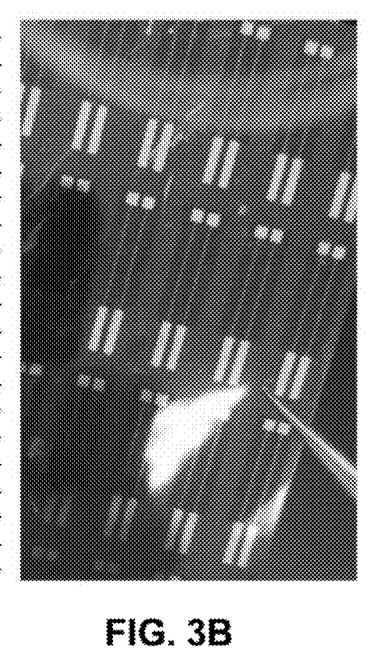
FIG. 3B shows a photograph of one embodiment of the probes as fabricated.

The Transistor Used was an STP24NF10.
Testing, Results, and Discussion
Testing Materials The probe geometries used are featured in FIG. 3. Two 1×1 mm² probes, one for the WE and one for the RE, are separated by 0.45 mm edge-to-edge; only the desired 1×1 mm² pad is left exposed, with the traces and surrounding area being covered by an additional layer of photoresist. Metal layer thicknesses and fabrication procedures follow literature examples. Contact pad geometries were designed to match the internal pins of a 1.25 mm pitch commercial flexible printed circuit (FPC) connector (39532045).

The pH panel used is known as a Britton-Robinson (B-R) buffer, a mix of a stock mixture of acetic, phosphoric, and boric acids and varying amounts of sodium hydroxide to determine the pH level; ratios and recipes were taken from literature examples. The B-R panel was chosen due to the absence of chlorine ions and ethylenediaminetetraacetdc acid, both of which alter RE potential and potentially cause redox reactions with the IrOx. Five baths were made between pH 2 and 10 and reference measurements were made beforehand using a standard commercial dual-junction glass pH meter and electrode.

Test Procedure

The test procedure followed two parallel stages: first, the OCP between an IrOx-coated WE and commercial AgCl RE (CHI111) was measured, across the 5-point pH buffer panel, via direct data acquisition with probes attached to the PCB. While this measurement was taking place, the modulation frequency was measured at the transmitted inductive signal. Calibration curves were calculated, and standard residuals (S.R.'s) were calculated as:

$$S.R. = \frac{observed - expected}{\sqrt{expected}} \quad (1)$$

The expected values are interpolations based on the linear regression fit taken for the calibration curve. The standard residuals represent the relative deviation of each data point from the overall dataset's linear fit.

System Output and Discussion

Figure 4A:
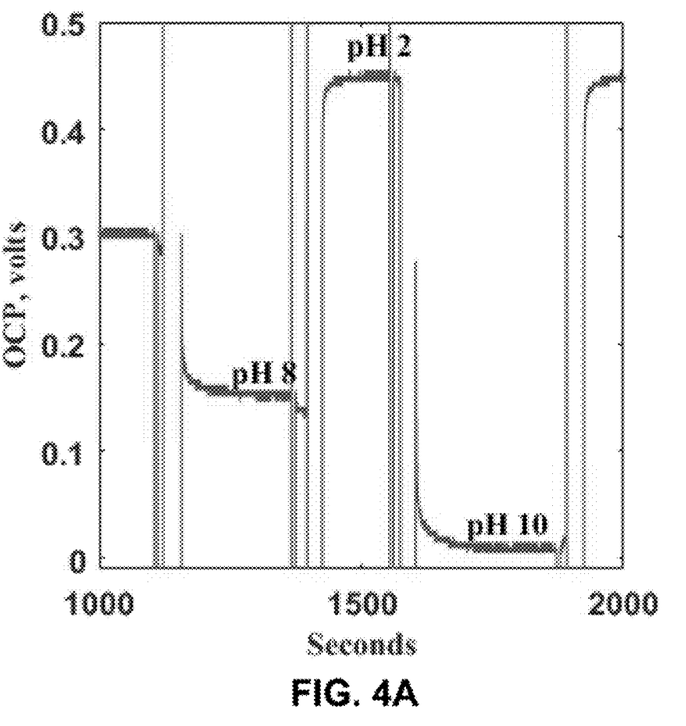
FIG. 4A shows a portion of the raw open circuit potential (OCP) as measured directly at the reference electrode (RE)/working electrode (WE) pair.
Figure 4B:
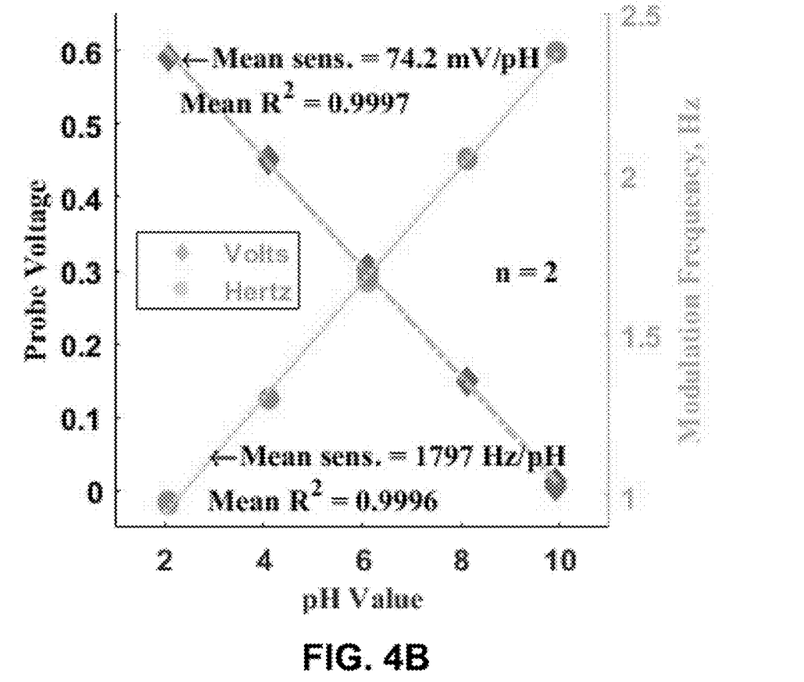
FIG. 4B shows linear calibrations for both the OCP data and the measured frequency values from cap modulation.
Figure 4C:
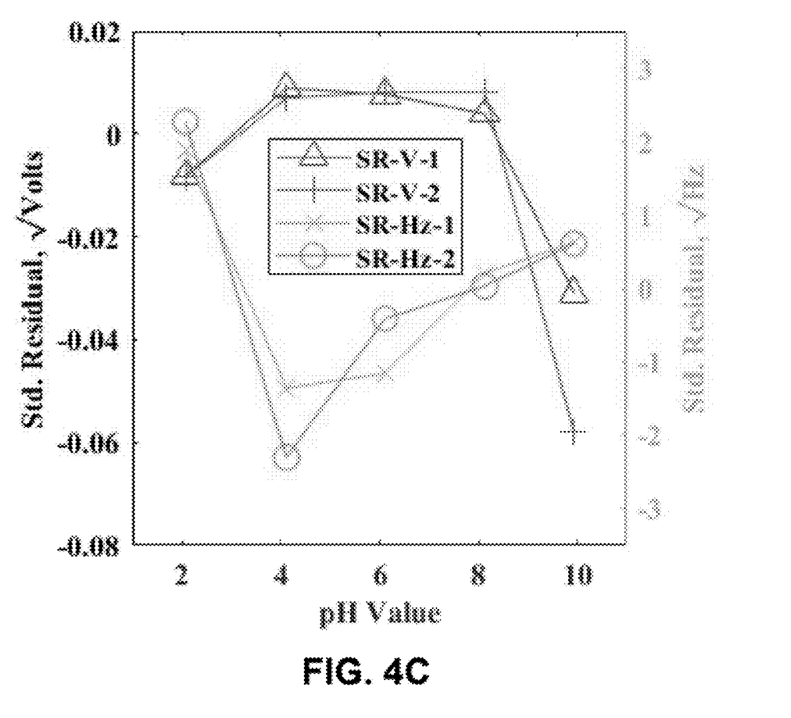
FIG. 4C shows standardized residuals for both the OCP data and the measured frequency from cap modulation. Both
Figure 5A:
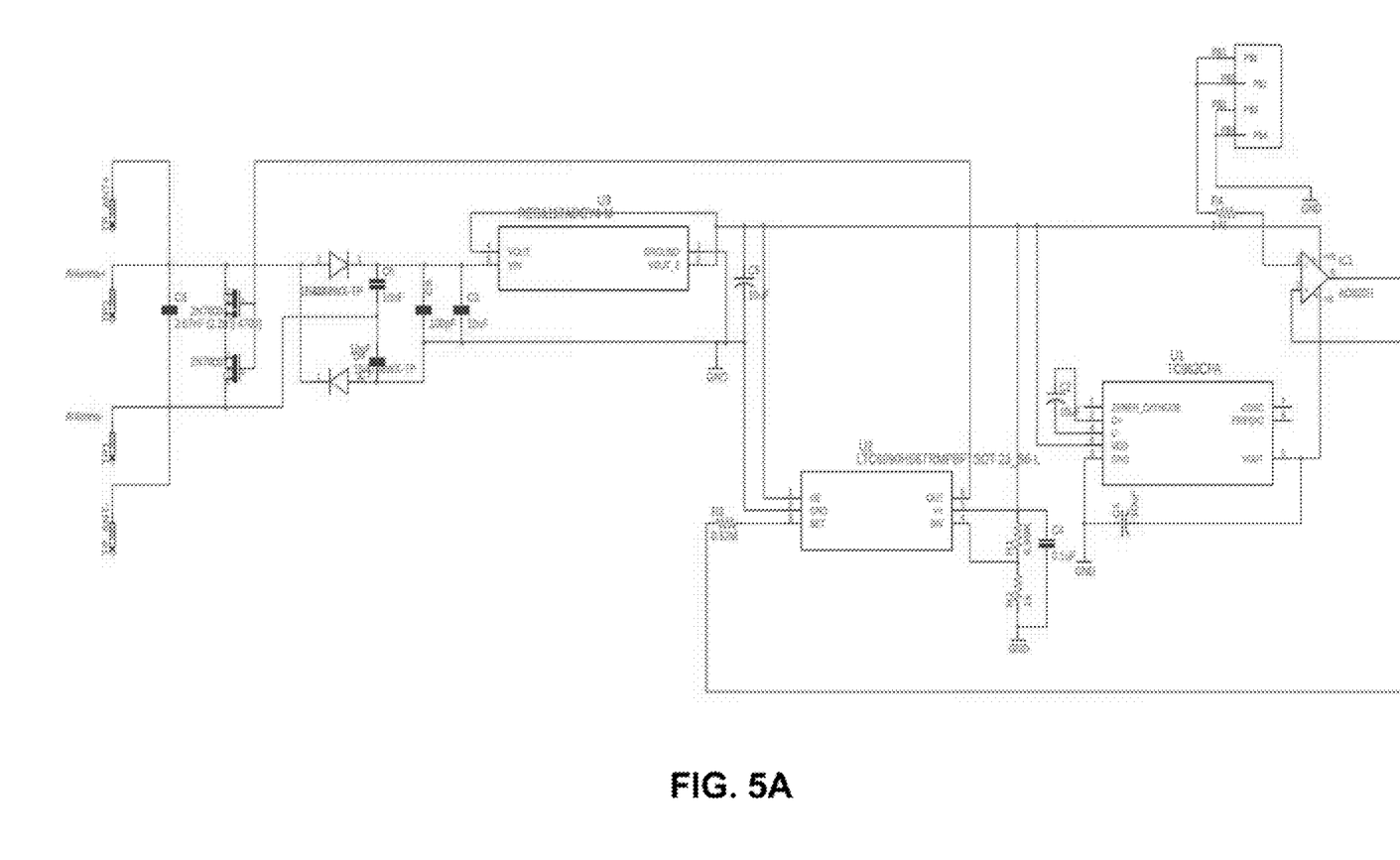
FIG. 5A shows a schematic for measuring the pH of a solution or an array of solutions.
Figure 5B:
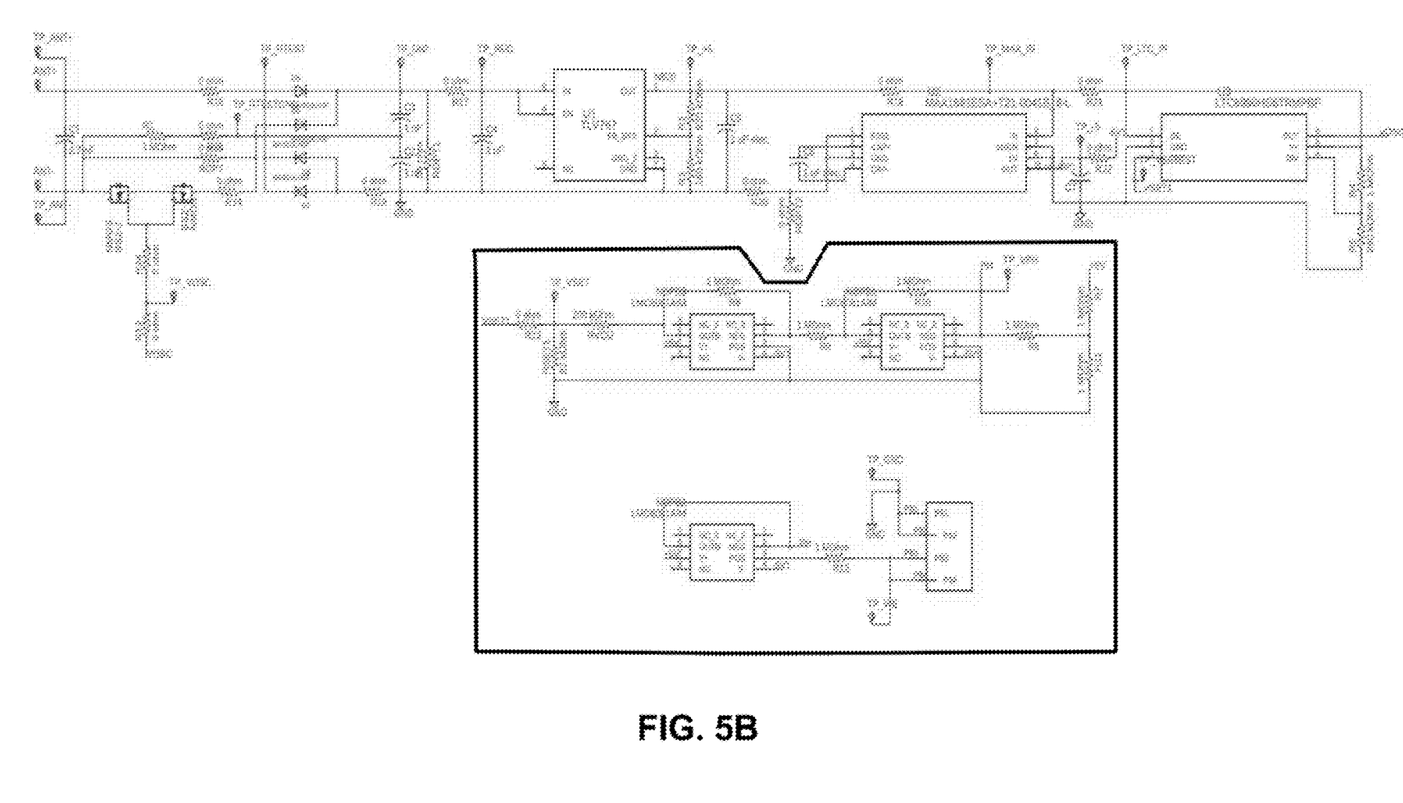
FIG. 5B shows another embodiment of the schematic that can be modified in the indicated section (black) such that the present invention can monitor other ionic sensors. The buffer, offset, and inverter sections are primarily for potentiometric sensing. This section could be replaced with a number of other circuits. For example, a transimpedance amplifier can be used for amperometric sensing, a current source can be used for resistometric sensing, etc.

Shown in FIGS. 4A-C are the results of testing. FIG. 4A features a portion of the raw OCP data being measured, while FIG. 4B and FIG. 4C are calibrated or calculated values. Specifically, FIG. 48 contains the calibrations and linear fit for both the potentiometric and modulation-frequency-based outputs; modulation frequencies are within manufacturer specification for an NDIV value of 32. Probe potentiometric sensitivities and modulation calibrations featured highly similar Pearson coefficients, indicating that insignificant distortion of the probe signal was caused by format conversion. In FIG. 4B, S.R.'s is used to explore the linearity of both measurements. The OCP measurements show bias in the basic pH region, which is to be expected to an extent with IrOx coatings. Modulated frequencies also feature linear bias as the baths trend towards basic pH values, though the cause is to be determined. It is possible that the system noise injected into the VCO's SET pin introduced uncertainty into the frequency measurement, or that measurement uncertainty may come from noise-induced phase instability.

CONCLUSIONS

This example demonstrates a system for load modulation-based communication of a potentiometric pH signal, as measured by a compact device powered via resonant inductive coupling. As this device features the applicable form factor and size to be located inside a sample tube cap, it can be expanded into a system which greatly expands the measurement capabilities of wet-lab researchers and a multitude of samples to be measured. Additional designs may feature miniaturization of the entire system and development of a buffer/envelope detector paired with gain to allow for automated measurement. This wireless, continuous chemical measurement system may be implemented across a wide range of laboratories doing biological, biochemical and ecological investigations.

As used herein, the term "about" refers to plus or minus 10% of the referenced number.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the below claims are solely for ease of examination of this patent application, and are exemplary, and are not intended in any way to limit the scope of the claims to the particular features having the corresponding reference numbers in the drawings. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting essentially of" or "consisting of", and as such the written description requirement for claiming one or more embodiments of the present invention using the phrase "consisting essentially of" or "consisting of" is met.

What is claimed is:

1. A system for passive wireless ionic sensing, the system comprising:
   a. a tube-type sample container (108);
   b. a sample cap (100) for the tube-type sample container (108), the sample cap comprising:
      i. a cap body (102), configured to fit over an opening of the tube-type sample container (108);
      ii. a printed circuit board (PCB) (104), integrated with the cap body (102), the PCB comprising a planar solenoid antenna configured to act as an inductive power receiver, wherein the planar solenoid antenna wrapped around the interior of the sample cap, the PCB comprising a passive wireless transmitter;
      iii. one or more ionic sensors (106) coupled to the PCB;
   c. a processor operatively coupled to the PCB; and
   d. a memory unit operatively coupled to the processor, said memory unit configured to store digitally encoded instructions that, when executed by the processor causes the processor to perform operations comprising:
      i. supplying power to the one or more ionic sensors, said power being generated by inductive coupling with the planar solenoid antenna;
      ii. receiving a signal from the one or more ionic sensors; and
      iii. transmitting the signal via the passive wireless transmitter.

2. The system of claim 1, wherein the system is wirelessly coupled to a base station configured to monitor an array of sample containers (108), wherein the base station receives the signal transmitted by the passive wireless transmitter, wherein the base station comprises a backscatter antenna, an envelope detector, and a logger channel for each of the array of sample containers (108).

3. The system of claim 1, wherein the one or more ionic sensors generate a signal corresponding to a pH, salt concentration, or other ionic concentration of a sample or solution contained in the sample container (108).

4. The system of claim 1, wherein the system allows for monitoring of a sample or solution within the sample container (108) without exposing the sample or solution to an environment external to the sample container (108).

5. The system of claim 1, wherein the system allows for continuous monitoring of a sample or solution in the sample container (108).

6. The system of claim 1, wherein the sample container (108) has a capacity of about 5 mL, 10 mL, 15 mL, 20 mL, 25 mL, 30 mL, 40 mL, 50 mL, 100 mL, 150 mL, 200 mL, 400 mL, 500 mL, or 1000 mL.

7. The system of claim 1, wherein the one or more sensors (106) comprise both a working electrode and a reference electrode on a polyimide substrate.

8. The system of claim 7, wherein the working electrode comprises a metal oxide electrode, and the reference electrode comprises an AgCl electrode.

9. The system of claim 7, wherein the electrodes are configured to be replaced if they are degraded.

10. The system of claim 1, wherein the signal has a frequency which is a fraction of a power carrier frequency.

11. The system of claim 1, wherein the PCB (104) comprises two opposing metal oxide silicon field effect transistors (MOSFETs).

12. The system of claim 1, wherein the system is configured to be powered by a Class E amplifier.

13. The system of claim 1, wherein the system is configured to be powered via a designated resonance frequency of about 1 MHz.

14. A method for continuous wireless ionic sensing of a chemical solution in a tube-type sample container (108), the method comprising:
   a. providing a sample cap (100). the sample cap comprising:
      i. a cap body (102), configured to fit over an opening of the tube-type sample container (108);
      ii. a printed circuit board (PCB) (104), integrated with the cap body (102), the PCB (104) comprising a planar solenoid antenna configured to act as an inductive power receiver, wherein the planar solenoid antenna wrapped around the interior of the sample cap, the PCB (104) comprising a passive wireless transmitter;
      iii. one or more ionic sensors (106) coupled to the PCB (104);
   b. affixing the sample cap (100) to the tube-type sample container (108), such that the one or more ionic sensors (106) are in contact with the solution;
   c. providing a base station configured to power the sample cap (100) and to monitor the sample container (108);
   d. placing the capped sample container (108) in proximity to the base station;
   e. wirelessly powering the one or more ionic sensors (106) via resonant inductive coupling to the base station;
   f. transmitting an output signal from the PCB (104); and
   g. receiving the output signal via the base station.

15. The method of claim 14, wherein the base station simultaneously monitors solutions from an array of sample containers (108).

\* \* \* \* \*